United States Patent

Yamagami et al.

[11] Patent Number: 5,948,554
[45] Date of Patent: Sep. 7, 1999

[54] MAGNETIC HEAD

[75] Inventors: Hiroshi Yamagami; Kazuichi Endo; Kazuhiro Kaneko; Masahiro Iizuka, all of Niigata-ken, Japan

[73] Assignee: Alps Electric Co., Ltd., Tokyo, Japan

[21] Appl. No.: 08/978,459

[22] Filed: Nov. 25, 1997

[30] Foreign Application Priority Data

Nov. 29, 1996 [JP] Japan .................................. 8-319770

[51] Int. Cl.$^6$ ...................................................... G11B 5/66
[52] U.S. Cl. ................. 428/692; 428/694 R; 428/694 T; 428/694 TS; 428/694 TM; 428/900; 360/113; 360/119; 360/120; 360/126
[58] Field of Search ................. 428/692, 694 T, 428/694 R, 694 TS, 694 TM, 900; 360/113, 119, 120, 126

[56] References Cited

U.S. PATENT DOCUMENTS

| | | | |
|---|---|---|---|
| 4,246,619 | 1/1981 | Hirai et al. | 360/125 |
| 4,316,228 | 2/1982 | Fujiwara et al. | 360/127 |
| 4,439,794 | 3/1984 | Shiroishi et al. | 360/127 |
| 4,450,494 | 5/1984 | Fujiwara et al. | 360/125 |
| 5,049,209 | 9/1991 | Sakakima et al. | 148/306 |
| 5,117,321 | 5/1992 | Nakanishi et al. | 360/120 |
| 5,218,500 | 6/1993 | Okuda et al. | 360/127 |
| 5,270,894 | 12/1993 | Okuda et al. | 360/126 |
| 5,278,716 | 1/1994 | Okuda et al. | 360/126 |
| 5,515,222 | 5/1996 | Kumagai et al. | 360/127 |
| 5,585,984 | 12/1996 | Hasegawe | 360/113 |

*Primary Examiner*—Leszek Kiliman
*Attorney, Agent, or Firm*—Brinks Hofer Gilson & Lione

[57] ABSTRACT

The ZnO amount contained in the ferrite is lowered more than those of conventional ones to increase the mean coefficient of thermal expansion of the ferrite. Thus, a difference between the mean coefficient of thermal expansion of the ferrite and the mean coefficient of thermal expansion of the soft magnetic material is reduced. Further, the $Fe_2O_3$ amount contained in the ferrite is suitably controlled to reduce the absolute value of the magnetocrystalline anisotropic energy K1 and the absolute value of the saturation magnetostriction $\lambda S$. Thus, the absolute value of the apparent magnetic anisotropic energy is lowered, and the magnetic anisotropy is weakened. The magnetic permeability and the head output can be elevated in a high frequency region by lowering the magnetic anisotropy.

8 Claims, 10 Drawing Sheets

MAGNETIC HEAD

BACKGROUND OF THE INVENTION

1. Field of the Invention

The present invention relates to a magnetic head having an MIG (metal-in-gap) structure in which a metal magnetic film is formed in a gap-opposing part of a ferrite-made core, specifically to a magnetic head which is effective when the metal magnetic film described above is formed of a soft magnetic material having excellent magnetic characteristics as compared with those of conventional ones.

2. Description of the Related Art

FIG. 11 is a perspective drawing of a magnetic head, and FIG. 12 is an enlarged plane drawing obtained by seeing the magnetic head from a surface side thereof rubbed against a recording medium.

The code 1 shown in the drawings is a core formed of single-crystal ferrite comprising $Fe_2O_3$, MnO and ZnO or a connected material of single-crystal ferrite and poly-crystal ferrite, and opposing planes 1a, 1a and inclining planes (track width-controlling planes) 1b, 1b inclining toward the opposing planes 1a, 1a described above are formed on the cores 1, 1.

Metal magnetic films 2 having a high saturation magnetic flux density such as Fe—Ta—N alloy and Fe—Al—Si alloy (sendust) are coated and formed on the opposing planes 1a, 1a and the inclining planes (track width-controlling planes) 1b, 1b described above, and the metal magnetic films 2 are connected with each other via a non-magnetic material to allow the connected part to become a magnetic gap G. Incidentally, Tw is a track width.

The code 3 is adhesive glass for connecting the metal magnetic films 2, 2 coated and formed on the opposing planes 1a, 1a, and also in the inclining planes (track width-controlling planes) 1b, 1b, the adhesive glass 3 described above is filled on the metal magnetic film 2 coated and formed on the core. The code 4 is a coil for recording or reproducing. In FIG. 12, an azimuthal angle of the magnetic gap G is zero degree but actually in the magnetic head, the magnetic gap G has an azimuthal angle in a clockwise direction or a counterclockwise direction against a magnetic circuit direction.

The magnetic head shown in FIG. 11 is formed in a β azimuth in which the gap-opposing plane is formed of a (100) plane in a crystallographic plane and the tape-rubbing plane is formed of a (110) plane. The direction of the crystallographic axis along the magnetic circuit direction is a <100> direction.

FIG. 3 is a ternary diagram showing the composition ratio of a ferrite material comprising $Fe_2O_3$, MnO and ZnO. The composition ratio of a ferrite material used usually in conventional magnetic heads is shown in (a) of the diagram, and the ratio $Fe_2O_3$:MnO:ZnO is 53 to 55 mol %:26 to 31 mol %:16 to 19 mol %.

A mol % of ZnO out of the three compounds constituting ferrite exerts a strong influence on the determination of a magnetic striction of a crystallographic axis and a mean coefficient α ferrite of thermal expansion of a ferrite material. If ZnO falls in a range of from 16 mol % to 19 mol %, both of the absolute value of a magnetic striction λ <100> in a <100> direction and a magnetic striction λ <111> in a <111> direction become values close to zero, and the mean coefficient a ferrite of thermal expansion of ferrite becomes about 115 ($10^{-7}$/° C.) at temperatures ranging from 100 to 300° C.

One reason why ZnO was changed from 16 mol % to 19 mol % in the past was that the absolute value of a magnetic striction λ <100> in a <100> direction and a magnetic striction λ <111> in a <111> direction could be lowered, and another one was that the mean coefficient α ferrite of thermal expansion of ferrite was made almost the same as the mean coefficient of thermal expansion of a soft magnetic material such as sendust for forming the metal magnetic film 2. A decrease in a difference between the mean coefficient α ferrite of thermal expansion of ferrite and the mean coefficient of thermal expansion of the soft magnetic material described above results in a reduction in the absolute value of a stress α total exerted in the magnetic circuit direction (<100> direction) of the cores 1, 1 in the vicinity of the gap G.

On the other hand, a mol % of $Fe_2O_3$ contained in ferrite exerts a strong influence on the magnetocrystalline anisotropic energy K1 and the saturation magnetostriction λs as the whole ferrite material. If $Fe_2O_3$ falls in a range of 53 mol % to 55 mol %, both of the absolute value of the magnetocrystalline anisotropic energy K1 and the absolute value of the saturation magnetostriction λs are reduced.

The magnetic anisotropy of a crystal axis depends only on the magnetocrystalline anisotropic energy K1 if ferrite is used alone. However, in the magnetic head shown in FIG. 11, processing strain and a difference in a coefficient of thermal expansion between the soft magnetic material constituting the metal magnetic film 2 and ferrite increase the stress α total exerted in the magnetic circuit direction (<100> direction) of the cores 1, 1 in the vicinity of the gap G. Thus, a magnetoelastic energy which is proportional to the product of the stress σ total and the saturation magnetostriction λS each described above comes to exert an influence on the magnetic anisotropy. Accordingly, it is estimated that the magnetic anisotropy of the magnetic axis <100> in the magnetic circuit direction in the magnetic head shown in FIG. 11 is determined by an apparent magnetic anisotropic energy obtained by subtracting the magnetoelastic energy from the magnetocrystalline anisotropic energy K1.

That is, the apparent magnetic anisotropic energy (Ea)= (the magnetocrystalline anisotropic energy K1)−(the magnetoelastic energy 3/2·σ total·λS) (σ total: stress, λS: saturation magnetostriction)

If this apparent magnetic anisotropic energy Ea is larger than zero (Ea>0), the crystal axis <100> becomes an easy axis of magnetization, and if it is smaller than zero (Ea<0), the crystal axis <100> becomes a hard axis of magnetization. The more the absolute value of Ea is close to zero, the more the magnetic anisotropy is weakened.

In a conventional magnetic head, the absolute value of the magnetocrystalline anisotropic energy K1 and the absolute values of the directional magnetostriction λ<100> and λ<111> have been lowered respectively and the absolute value of the saturation magnetostriction λs has been reduced by decreasing the absolute value of the apparent magnetic anisotropic energy described above as much as possible, that is, making it isotropic so that the magnetic permeability having an inversely proportional relation to the apparent magnetic anisotropic energy described above can be enhanced. Further, the absolute value of the stress σ total has been lowered as well by making the mean coefficient α ferrite of thermal expansion of ferrite almost the same as the mean coefficient of thermal expansion of the soft magnetic material such as sendust.

However, soft magnetic materials such as Fe—Ta—N alloy and Fe—Al—Si (sendust) which have so far been used for the metal magnetic film 2 are inferior in magnetic characteristics. The Fe—Ta—N alloy is susceptible to corrosion and therefore is not excellent in a corrosion resistance. Meanwhile, the Fe—Al—Si alloy (sendust) has a low saturation flux density and therefore is likely to bring about a reduction in the head output.

Accordingly, the present inventors prepared a magnetic head in which the material described in Japanese Unexamined Patent Publication No. 7-85411 (U.S. Pat. No. 5,585,984) as a soft magnetic material having more excellent magnetic characteristics than those of conventional soft magnetic materials, that is, an iron base fine crystalline material containing crystal of carbide or nitride was used for the metal magnetic film 2 and the core 1 was formed of ferrite having the conventional composition described above to confirm the head output. The iron base fine crystalline film described above has a high saturation flux density and a high magnetic permeability, and therefore high output is expected to be obtained in itself in magnetic recording and reproducing. However, it was confirmed that the head output was reduced when magnetic recording and reproducing were actually carried out at as high frequency as several MHz to several 10 MHz.

This is estimated to originate in the fact that since the iron base fine crystalline material described in Japanese Unexamined Patent Publication No. 7-85411 (U.S. Pat. No. 5,585,984) has a higher coefficient of thermal expansion as compared with those of conventional metal magnetic films, a difference between the mean coefficient $\alpha$ ferrite of thermal expansion of ferrite and the coefficient of thermal expansion of the soft magnetic material (iron base fine crystalline material) described above is expanded. That is, this is estimated to be caused by the fact that the stress $\alpha$ total exerted in the magnetic circuit direction (<100> direction) of the cores 1, 1 in the vicinity of the gap G is increased and as a result thereof, the absolute value of the apparent magnetic anisotropic energy Ea is elevated, which in turn results in a reduction in the magnetic permeability having an inversely proportional relation to the apparent magnetic anisotropic energy Ea described above.

SUMMARY OF THE INVENTION

The present invention has been made in order to solve the conventional problems described above, and an object thereof is to provide a magnetic head capable of increasing a magnetic permeability in a magnetic circuit direction against an alternative magnetic field of a high frequency and enhancing an output while using a soft magnetic material which is excellent in magnetic characteristics and has a high mean coefficient of thermal expansion as compared with those of conventional ones.

A first invention relates to a magnetic head in which a metal magnetic film made of a soft magnetic material is formed on a gap-opposing part of a pair of cores, at least the gap-opposing part being formed of single-crystal ferrite, and an adhesive material for connecting the cores at the gap-opposing part described above is filled on the side parts of the cores described above, the single-crystal ferrite described above being composed of $Fe_2O_3$, MnO and ZnO, the composition ratio thereof being 52 to 54 mol %:8 to 16 mol % in terms of $Fe_2O_3$:ZnO, and the balance thereof being MnO, wherein the single-crystal ferrite described above has a mean coefficient $\alpha$ ferrite of thermal expansion ranging from 120 to 140 ($10^{-7}$/° C.) at temperatures falling in a range of 100 to 300° C., the metal magnetic film described above comprises a composition represented by a formula $Fe_{100-a-b-c-d}$—$X_a$—$M_b$—$Z_c$—$T_d$, X representing either or both of Si and Al, M representing at least one metal selected from the group consisting of Zr, Hf, Nb and Ta, Z representing either or both of C and N, T representing at least one metal selected from the group consisting of Cr, Ti, Re, Ru, Rh, Ni, Co, Pd, Pt and Au, $0.5 \leq a \leq 25$ (atomic %), $1 \leq b \leq 10$ (atomic %), $0.5 \leq c \leq 15$ (atomic %), $0 \leq d \leq 10$ (atomic %), the balance thereof being atomic % of Fe, and the metal magnetic film is formed of the soft magnetic material containing crystal of carbide or nitride of the metal group M.

A difference between the mean coefficient $\alpha$ metal of thermal expansion of the soft magnetic material described above and the mean coefficient $\alpha$ ferrite of thermal expansion of the ferrite described above is preferably $-10$ ($10^{-7}$/° C.)$\leq (\alpha$ metal$-\alpha$ ferrite$) \leq 5$ ($10^{-7}$/° C.) at temperatures falling in a range of 100 to 300° C.

Further, the stress $\alpha$ total exerted to the gap G-opposing part in a magnetic circuit direction is preferably 800 (MPa) or less in terms of an absolute value.

A second invention relates to a magnetic head in which a metal magnetic film made of a soft magnetic material is formed on a gap-opposing part of a pair of cores, at least the gap-opposing part being formed of single-crystal ferrite, and an adhesive material for connecting the cores at the gap-opposing part described above is filled on the side parts of the cores described above, the single-crystal ferrite described above being composed of $Fe_2O_3$, MnO and ZnO, the composition ratio thereof being 52 to 54 mol %:8 to 16 mol % in terms of $Fe_2O_3$:ZnO, and the balance thereof being MnO, wherein the single-crystal ferrite described above has a mean coefficient $\alpha$ ferrite of thermal expansion ranging from 120 to 140 ($10^{-7}$/° C.) at temperatures falling in a range of 100 to 300° C., the metal magnetic film described above comprises a composition represented by a formula $Fe_{100-e-f-b-c-d}$—$Si_e$—$Al_f$—$M_b$—$Z_c$—$T_d$, M representing at least one metal selected from the group consisting of Zr, Hf, Nb and Ta, Z representing either or both of C and N, T representing at least one metal selected from the group consisting of Cr, Ti, Re, Ru, Rh, Ni, Co, Pd, Pt and Au, $8 \leq e \leq 15$ (atomic %), $0.5 \leq f \leq 10$ (atomic %), $1 \leq b \leq 10$ (atomic %), $0.5 \leq c \leq 15$ (atomic %), $0 \leq d \leq 10$ (atomic %), the balance thereof being atomic % of Fe, and the metal magnetic film is formed of the soft magnetic material containing crystal of carbide or nitride of the metal group M.

A difference between the mean coefficient $\alpha$ metal of thermal expansion of the soft magnetic material described above and the mean coefficient $\alpha$ ferrite of thermal expansion of the ferrite described above is preferably $-10$ ($10^{-7}$/° C.)$\leq (\alpha$ metal$-\alpha$ ferrite$) \leq 5$ ($10^{-7}$/° C.) at temperatures falling in a range of 100 to 300° C.

Further, the stress $\alpha$ total exerted to the gap G-opposing part in a magnetic circuit direction is preferably 800 (MPa) or less in terms of an absolute value.

The soft magnetic material described above has some excellent magnetic characteristics described below.

(1) The saturation magnetostriction $\lambda$s becomes as low as 5 ($10^{-6}$).

(2) The saturation flux density Bs becomes as high as 1.3 (T).

(3) The magnetic permeability at 1 MHz becomes as high as 8000.

(4) No change is found on the corrosion and discoloration situations after dipping in brine (0.9%) for 24 hours.

It is known that the crystal structure of single-crystal ferrite is cubic and all the directions of the crystallographic axis are shown by three crystallographic axes <100> and one crystallographic axis <111>. A magnetic head having different properties can be produced depending on which crystal faces of a ferrite material are used to form the gap-opposing plane and the tape-rubbing plane of the magnetic head. It is noted that a magnetic head formed in a β azimuth in which, for example, a gap opposing plane is formed of a (100) plane and a tape-rubbing plane is formed of a (110) plane in a crystallographic plane has an excellent wear resistance in the tape-rubbing plane. In general, a VHS azimuth and a B azimuth as well as the β azimuth are known.

A magnetic head to which the present invention is suited is of a structure as shown in FIG. 1, and as is the case with a so-called β azimuth in which a gap opposing plane is a (100) plane of single-crystal ferrite and a tape rubbing plane is a (110) plane thereof and a so-called B azimuth in which a gap opposing plane is a (211) plane of single-crystal ferrite and a tape rubbing plane is a (110) plane thereof, two crystallographic axes <100> and <111> having different directions are present on the main magnetic circuit L of an alternative magnetic field, and the two crystallographic axes described above exert an influence on the main magnetic circuit L.

When an alternative magnetic field having a high frequency of 10 MHz or more passes through a core, a magnetic permeable effect caused by so-called spin-rotation in which the direction of magnetization rotates between a magnetic circuit direction and a direction crossing the magnetic circuit direction is considered to be more dominant in single-crystal ferrite than a magnetic permeable effect caused by a change in magnetic domain walls. That is, a change in a magnetic field in ferrite caused when a magnetic field changing according to passage of time is given includes a phenomenon in which magnetic domain walls in ferrite move to cause the magnetization to be turned toward a direction of a magnetic field and spin-rotation in which a magnetization direction rotates according to time passage in a magnetic field, and passage of an alternative magnetic field having a high frequency is facilitated more dominantly by the spin-rotation described above than by movement of the magnetic domain walls. In order to enhance the magnetic permeability by this spin-rotation, it is considered to be effective to anisotropically bring the magnetic circuit directions close without limit.

Further, it is estimated that a magnetic anisotropy in the magnetic head depends on the absolute value of the apparent magnetic anisotropic energy obtained by subtracting the magnetoelastic energy which is proportional to the product of the stress σ total and the saturation magnetostriction λS from the magnetocrystalline anisotropic energy K1.

Accordingly, in the present invention, the composition ratio of $Fe_2O_3$ out of the three compounds constituting ferrite has been made almost the same as a conventional one to thereby lower both of the absolute value of the magnetocrystalline anisotropic energy K1 and the absolute value of the saturation magnetostriction λS.

Further, the composition ratio of ZnO has been settled to a composition ratio of 8 to 16 mol % which is lower than a conventional composition (16 to 19 mol %), to thereby enhance the mean coefficient α ferrite of thermal expansion of ferrite. This enables to reduce a difference between the mean coefficient of thermal expansion of the metal magnetic film described previously and the mean coefficient α ferrite of thermal expansion of ferrite even when the preceding iron base fine crystalline material having a larger mean coefficient of thermal expansion than that of sendust or the like, and thus a stress exerted to the gap-opposing part can be reduced.

As described above, not only the absolute value of the magnetocrystalline anisotropic energy K1 related to the apparent magnetic anisotropic energy is lowered but also both of the absolute value of the stress α total and the absolute value of the saturation magnetostriction λ S are reduced, whereby the magnetoelastic energy is lowered. Thus, the absolute value of the apparent magnetic anisotropic energy is decreased. Accordingly, the magnetic anisotropy of the crystallographic axis is weakened, and spin-rotation is easily exerted in a high frequency area, which make it possible to enhance the magnetic permeability and the head output.

DESCRIPTION OF THE PREFERRED EMBODIMENTS

Figure 1:
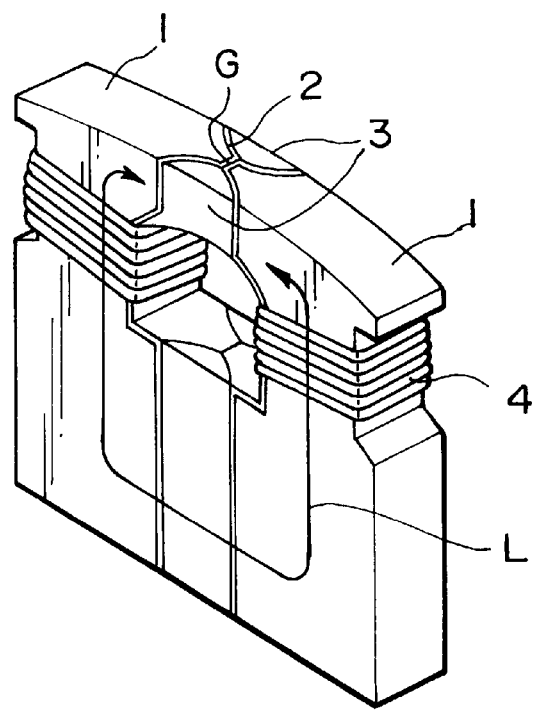
FIG. 1 is a perspective drawing of the magnetic head.
Figure 2:
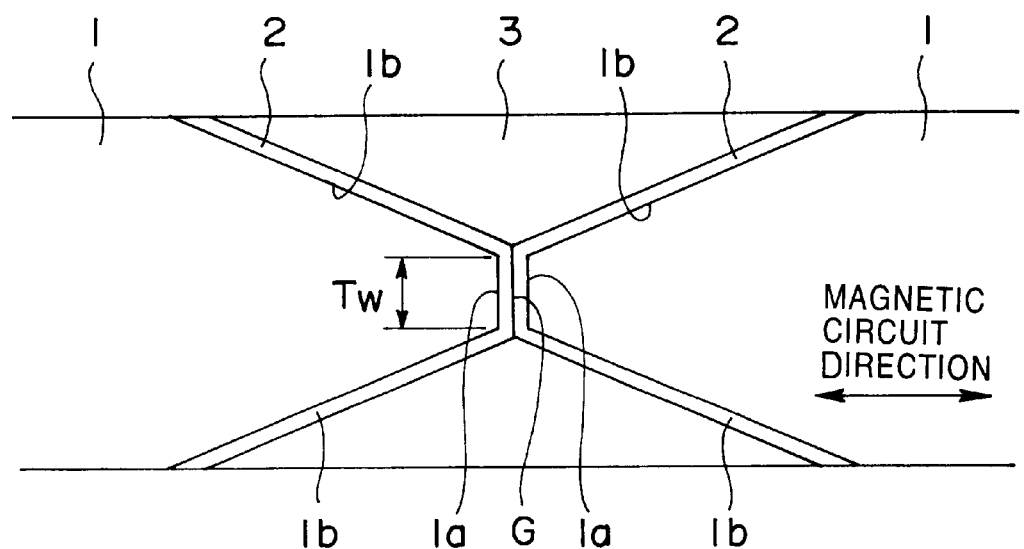
FIG. 2 is an enlarged plan view showing a part in the vicinity of the gap of the magnetic head.

FIG. 1 is a perspective drawing of the magnetic head of the present invention, and FIG. 2 is an enlarged plan view obtained by seeing the magnetic head of the present invention from a surface side thereof rubbed against a recording medium.

The cores 1, 1 of the magnetic head shown in FIG. 1 and FIG. 2 are formed of Mn—Zn base single-crystal ferrite obtained by mixing $Fe_2O_3$, MnO and ZnO in a prescribed composition ratio and sintering them in a mold or formed of a connected material of single-crystal ferrite and polycrystal ferrite, and at least the gap-opposing part is formed of single-crystal ferrite.

The gap-opposing planes 1a, 1a and the inclining planes (track width-controlling planes) 1b, 1b inclining to the magnetic circuit direction are formed at the side ends of the cores 1, 1 described above, and the metal magnetic film 2 comprising a soft magnetic material of iron base fine crystal having excellent magnetic characteristics is coated and formed on the gap-opposing planes 1a, 1a and the inclining planes (track width-controlling planes) 1b, 1b described above. The metal magnetic film 2 may be coated and formed only on the gap-opposing planes 1a, 1a.

In the present invention, either of two kinds of the following soft magnetic materials is used for the metal magnetic film 2:

(1) the soft magnetic material comprising a composition represented by a formula $Fe_{100-a-b-c-d}$—$X_a$—$M_b$—$Z_c$—$T_d$, wherein X represents either or both of Si and Al; M represents at least one metal selected from the group consisting of Zr, Hf, Nb and Ta; Z represents either or both of C and N; T represents at least one metal selected from the group consisting of Cr, Ti, Re, Ru, Rh, Ni, Co, Pd, Pt and Au; $0.5 \leq a \leq 25$ (atomic %), $1 \leq b \leq 10$ (atomic %), $0.5 \leq c \leq 15$ (atomic %), $0 \leq d \leq 10$ (atomic %), and the balance is atomic % of Fe, and containing crystal of carbide or nitride of the metal group M, and (2) the soft magnetic material comprising a composition represented by a formula $Fe_{100-e-f-b-c-d}$—$Si_e$—$Al_f$—$M_b$—$Z_c$—$T_d$, wherein M represents at least one metal selected from the group consisting of Zr, Hf, Nb and Ta; Z represents either or both of C and N; T represents at least one metal selected from the group consisting of Cr, Ti, Re, Ru, Rh, Ni, Co, Pd, Pt and Au; $8 \leq e \leq 15$ (atomic %), $0.5 \leq f \leq 10$ (atomic %), $1 \leq b \leq 10$ (atomic %), $0.5 \leq c \leq 15$ (atomic %), $0 \leq d \leq 10$ (atomic %), and the balance is atomic % of Fe, and containing crystal of carbide or nitride of the metal group M.

In the soft magnetic materials described above, Fe is a principal component and an element for providing magnetism. Grains comprising carbide or nitride of the metal group M described above have the effects to control growing and coarsening of crystal comprising Fe as a principal component and improve a heat resistance in the soft magnetic characteristics. The addition amount of the metal group M is preferably 1 mol % or more but the amount exceeding 10 mol % reduces the saturation flux density Bs and therefore is not preferred.

C or N is combined with the metal group M described above to form carbide or nitride. The addition amount thereof is preferably 0.5 mol % or more but the amount exceeding 15 mol % reduces the saturation flux density Bs and therefore is not preferred.

The addition of Al: (1) improves the environmental resistance, (2) causes Al to be dissolved in crystal of Fe in a solid solution to increase the resistivity and (3) delays the growth of grains, lowers the magnetocrystalline anisotropic energy and elevates the thermal resistance temperature.

The addition amount of Al is preferably 0.5 mol % or more, but the amount of 25 mol % or more increases the saturation magnetostriction λS too much and reduces the saturation flux density Bs. Accordingly, it is not preferred.

The addition of Si: (1) reduces the saturation magnetostriction λS increased by the addition of Al, (2) makes the magnetic film liable to be amorphous in sputtering and therefore can reduce the content of carbides or nitrides though carbides or nitrides have so far been added in large quantities in order to make the magnetic film liable to be amorphous, which makes it possible to control a reduction in the saturation flux density Bs caused by carbides or nitrides, (3) causes Si to be dissolved in crystal of Fe in a solid solution to increase the resistivity and (4) delays the growth of grains, lowers the magnetocrystalline anisotropic energy and elevates the thermal resistance temperature.

The addition amount of Si is preferably 0.5 mol % or more, but the amount of 25 mol % or more reduces the saturation flux density Bs and therefore is not preferred.

The combined addition of Si and Al not only suppresses the saturation magnetostriction λS to 0 to $3.0 \times 10^{-6}$ but also enhances the environmental resistance. However, in order to reduce more the saturation magnetostriction λS, (Si/Al) is preferably set to 3/2 or more.

The soft magnetic material described above has magnetic characteristics such as (1) low magnetic striction, (2) high saturation flux density, (3) high magnetic permeability and (4) high reliability provided by a corrosion resistance.

The code 3 is adhesive glass for connecting the metal magnetic films 2, 2 coated and formed on the gap-opposing planes 1a, 1a or the cores, and the adhesive glass 3 described above is filled on the surface of the metal magnetic films 2, 2 coated and formed on the inclining planes (track width-controlling planes) 1b, 1b. If the metal magnetic film 2 is not formed on the inclining planes 1b, 1b, the adhesive glass 3 is filled directly on the surface of the core 1. The connecting part described above is the magnetic gap G, and Tw is a track width. The code 4 is a coil for recording or reproducing.

The magnetic head having an MIG (metal in gap) structure shown in FIG. 1 is installed in a high density magnetic recording apparatus such as a rotating head device of DDS and VCR apparatuses and others, wherein recording and reproducing operations against a magnetic recording medium such as a metal tape are carried out.

The magnetic head of the present invention is formed in a so-called β azimuth, in which the gap opposing planes 1a, 1a are formed of a (100) plane and the tape-rubbing planes are formed of a (110) plane in the crystallographic planes of single-crystal ferrite. The direction of the crystallographic axis along the magnetic circuit direction in the vicinity of the rubbing plane is a <100> direction. In the magnetic head formed in the β azimuth, the magnetic tape-rubbing plane has an excellent wear resistance, and it becomes possible to elevate a relative moving speed between the recording medium and the magnetic head, which is required for recording signals having a high frequency.

The composition ratio ($Fe_2O_3$:ZnO) of single-crystal ferrite used for the cores 1, 1 in the present invention is (52 to 54 mol %:8 to 16 mol %), and the balance thereof is MnO. For example, MnO accounts for 30 to 40 mol %. The single-crystal ferrite of this composition ratio is selected from the range of (b) in the ternary diagram shown in FIG. 3.

Figure 3:
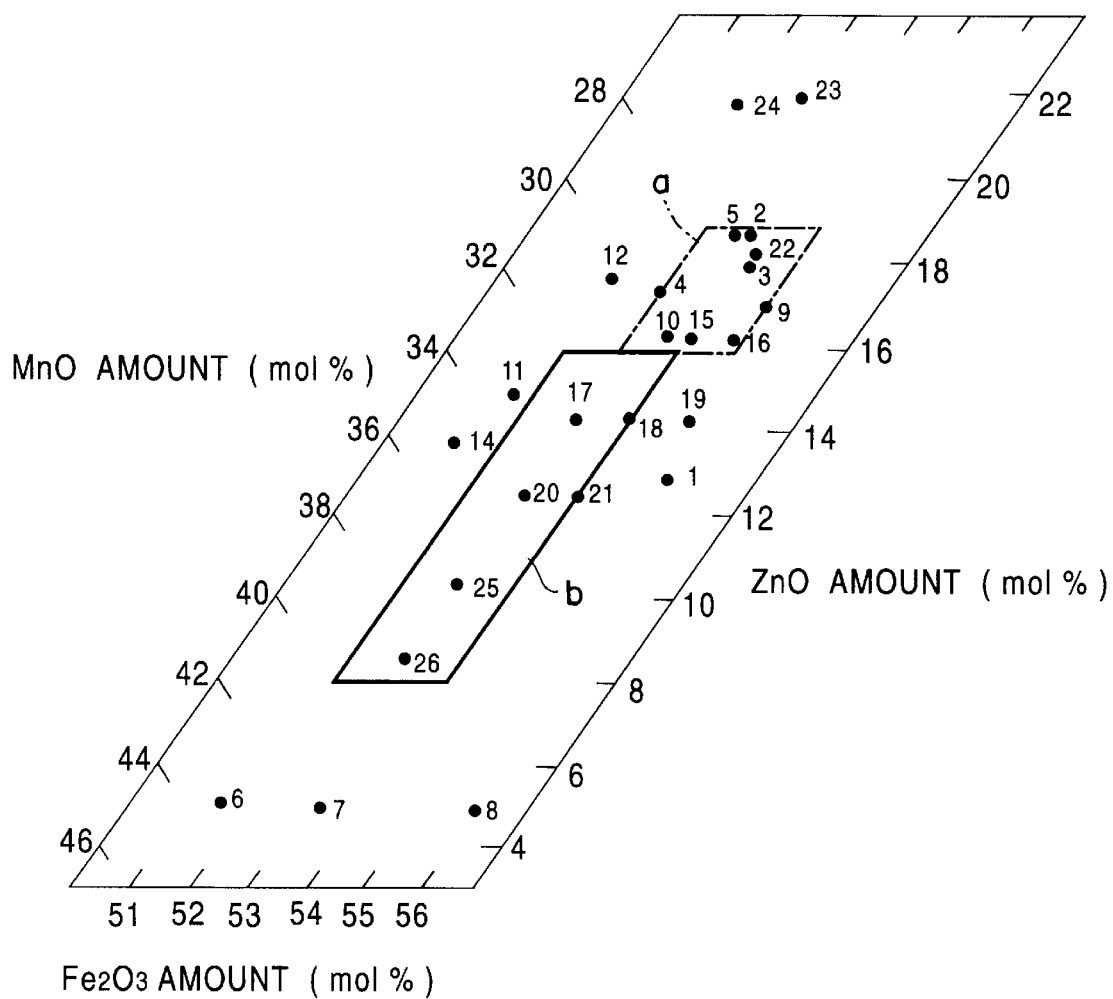
FIG. 3 is a ternary diagram of a single-crystal ferrite material composed of $Fe_2O_3$, MnO and ZnO.

In the single-crystal ferrite, the composition ratio of the ternary diagram shown in FIG. 3 is selected, whereby determined are the magnetocrystalline anisotropic energy K1, the saturation magnetostriction λS, the magnetic striction λ <100> of a crystallographic axis <100>, the magnetic striction λ <111> of a crystallographic axis <111> and the coefficient α ferrite of thermal expansion.

The magnetocrystalline anisotropic energy K1 and the saturation magnetostriction λS each described above are strongly influenced by mol % of $Fe_2O_3$ contained in the ferrite. The $Fe_2O_3$ amount of 52 to 54 mol % falling in the range of the composition ratio prescribed in the present invention decreases the absolute value of the magnetocrystalline anisotropic energy K1 and the absolute value of the saturation magnetostriction λS.

The magnetic striction λ <100> of the crystallographic axis <100>, the magnetic striction λ <111> of the crystallographic axis <111> and the coefficient α ferrite of thermal expansion each described above are strongly influenced by mol % of ZnO contained in the ferrite. The ZnO amount of 8 to 16 mol % falling in the range of the composition ratio prescribed in the present invention increases the absolute values of the magnetic striction λ <100> of the crystallographic axis <100> and the magnetic striction λ <111> of the crystallographic axis <111> and makes the mean coefficient α ferrite of thermal expansion as large as 120 to 140 ($10^{-7}/°$ C.) at temperatures ranging from 100 to 300° C. as compared with those of conventional ones [ferrite of a conventional composition (a): about 115 ($10^{-7}/°°$ C.)].

In the present invention, the reason for using a ferrite material having a large mean coefficient α ferrite of thermal expansion is that the mean coefficients α metal of thermal expansion of the soft magnetic materials shown in (1) and (2) described above grow large as compared with the mean coefficients of thermal expansion of soft magnetic materials (for example, sendust) which have so far been used. That is, the ferrite material having a low mol % of ZnO is used in order to reduce a difference between the mean coefficient α ferrite of thermal expansion of ferrite and the mean coefficient α metal of thermal expansion of the soft magnetic material as much as possible.

The mean coefficients α metal of thermal expansion of the soft magnetic materials shown in (1) and (2) described above are on a level of 125 to 140 ($10^{-7}/°$ C.) at temperatures ranging from room temperatures to 600° C. In particular, a difference between the mean coefficient α metal of thermal expansion of the soft magnetic material and the mean coefficient α ferrite of thermal expansion of ferrite is preferably $-10$ ($10^{-7}/°$ C.)$\leq$(α metal$-$α ferrite)$\leq 5$ ($10^{-7}/°$ C.).

Further, a difference between the mean coefficient α ferrite of thermal expansion of ferrite and the mean coefficient α glass of thermal expansion of the adhesive glass 3 is preferably small as well, and therefore glass having almost the same mean coefficient α glass of thermal expansion as the mean coefficient α ferrite of thermal expansion of the ferrite described above at temperatures falling in a range of 100 to 300° C. is used for the adhesive glass 3.

Thus, both of a difference between the mean coefficient α ferrite of thermal expansion of ferrite and the mean coefficient α metal of thermal expansion of the soft magnetic material and a difference between the mean coefficient α ferrite of thermal expansion of ferrite and the mean coefficient α glass of thermal expansion of the adhesive glass 3 are small, and therefore the absolute value of the stress α total exerted in the magnetic circuit direction (<100> direction) of the cores 1, 1 in the vicinity of the gap G is reduced. In particular, the stress α total described above is preferably 800 (MPa) or less in terms of an absolute value.

In the magnetic head shown in FIG. 1, the stress α total exerts a large influence in the gap G-opposing part, and the value of the magnetoelastic energy which is proportional to the product of the stress σ total and the saturation magnetostriction λS as the whole ferrite exerts an influence on the magnetic anisotropy. Accordingly, it is estimated that the magnetic anisotropy of the magnetic axis depends on the apparent magnetic anisotropic energy obtained by subtracting the preceding magnetoelastic energy from the magnetocrystalline anisotropic energy K1.

That is, the apparent magnetic anisotropic energy (Ea)= (the magnetocrystalline anisotropic energy K1)−(the magnetoelastic energy $3/2 \cdot \sigma$ total$\cdot \lambda S$)

If the absolute value of the apparent magnetic anisotropic energy described above is increased, the magnetic anisotropy is strengthened, and if the absolute value of the apparent magnetic anisotropic energy described above is decreased, the magnetic anisotropy is weakened and close to isotropy.

As described above, in the present invention, the mean coefficient of thermal expansion α ferrite of ferrite is increased by reducing the mol % of ZnO as compared with those of conventional ones to decrease a difference between the mean coefficient α metal of thermal expansion of the soft magnetic material forming the metal magnetic film 2 and the mean coefficient α ferrite of thermal expansion of ferrite, whereby the absolute value of the stress α total exerted in the magnetic circuit direction (<100> direction) in the vicinity of the gap G is reduced. While the respective absolute values of the magnetic striction λ <100> in a <100> direction and the magnetic striction λ <111> in a <111> direction are large, the absolute value of the saturation magnetostriction λS is set to a value close to zero. Accordingly, the absolute value of the magnetoelastic energy obtained from the product of the stress α total and the saturation magnetostriction λS is reduced. Further, the absolute value of the magnetocrystalline anisotropic energy K1 is small as well, and therefore the absolute value of the apparent magnetic anisotropic energy obtained by subtracting the magnetoelastic energy from the magnetocrystalline anisotropic energy K1 is reduced as well. Accordingly, the magnetic anisotropy is weakened.

The magnetic head of the present invention is used for, for example, DDS (digital data strage) and used in a high frequency area of some MHz to about 10 MHz or higher. In such high frequency area, it can be facilitated to exert spin-rotation by allowing the magnetic anisotropy of the crystallographic axis to be brought close to isotropy, whereby the magnetic permeability and the head output can be enhanced.

It has been explained that the magnetic head of the present invention is formed in a β azimuth, but the magnetic head may be formed in a B azimuth in which two crystallographic axes <100> and <111> having different directions exert an influence on the main magnetic circuit L of an alternative magnetic field as is the case with the β azimuth.

EXAMPLES

Examples of an MIG magnetic head which is formed in the β azimuth and in which the soft magnetic material of either (1) or (2) described above is used for the metal magnetic film 2 shall be explained below.

The experiments were carried out on the standardized conditions described in the following (1) to (3).

(1) In the magnetic head, there were set the track width Tw to 12 μm, the depth of the gap G to 14 to 17 μm and the gap length to 0.2 μm. Further, the azimuth angle was set to 20°.

(2) A commercial MP tape for Hi-8 was used for a tape as a recording medium, and the relative speed of the magnetic head to the tape was set to 6.26 m/sec.

(3) In order to determine the head output, recording was carried out on the tape to measure the reproduction output by means of an externally applying tester.

TABLE 1

| Composition | $\mu$ 1 MHz | $\mu$ 10 MHz | K1 (J/m³) | $\lambda_{100}$ (10⁻⁶) | $\lambda_{111}$ (10⁻⁶) | $\lambda s$ (10⁻⁶) | α ferrite (10⁻⁷/° C.) | Fe₂O₃ (mol %) | MnO (mol %) | ZnO (mol %) | αftg–αFTg (10⁻⁷/° C.) | AVG R/P₂₁ MHz (dB) |
|---|---|---|---|---|---|---|---|---|---|---|---|---|
| 1 | 850 | 400 | 200 | −7.00 | 8.00 | 2.00 | 129.8 | 55.4 | 31.5 | 13.1 | −4.8 | −0.5 |
| 2 | 1000 | 375 | 100 | −8.00 | 4.00 | −0.80 | 116.8 | 53.8 | 27.5 | 18.7 | 8.2 | |
| 3 | 750 | 360 | 80 | −5.00 | 4.50 | 0.70 | 119.0 | 54.2 | 27.7 | 18.1 | 6.0 | |
| 4 | 1680 | 450 | −60 | −6.40 | 6.00 | −1.04 | 116.0 | 53.1 | 29.4 | 17.5 | 9.0 | 0 |
| 5 | 1430 | 450 | 20 | −10.00 | 9.20 | 1.52 | 114.0 | 53.6 | 27.5 | 18.9 | 11.0 | |
| 6 | 1274 | 406 | −550 | −18.80 | 2.57 | −5.98 | 153.0 | 51.4 | 43.5 | 5.1 | −28.0 | −0.2 |
| 7 | 1619 | 420 | −80 | −12.50 | 2.90 | −3.26 | 154.0 | 53.3 | 41.7 | 5.0 | −29.0 | 0.9 |
| 8 | 703 | 420 | 300 | −11.60 | 13.00 | 3.16 | 152.0 | 56.0 | 39.0 | 5.0 | −27.0 | −0.3 |
| 9 | 839 | 433 | 20 | −7.05 | 5.82 | 0.70 | 119.0 | 55.2 | 27.7 | 17.1 | 6.0 | |
| 10 | 1325 | 471 | 10 | −8.27 | 5.76 | 0.15 | 121.0 | 53.5 | 30.1 | 16.4 | 4.0 | |
| 11 | 1258 | 340 | −500 | −13.50 | 1.54 | −4.47 | 117.0 | 51.6 | 33.6 | 14.8 | 8.0 | 0.1 |
| 12 | 1819 | 397 | −300 | −10.86 | 2.32 | −2.95 | 117.8 | 51.8 | 30.5 | 17.7 | 7.2 | 0 |
| 13 | 969 | 528 | −500 | −10.53 | 1.56 | −3.28 | 111.9 | 49.7 | 32.2 | 18.1 | 13.1 | −0.1 |
| 14 | 1038 | 350 | <0 | −16.40 | 3.70 | −4.34 | 124.7 | 51.1 | 35.2 | 13.7 | 0.3 | −0.1 |
| 15 | 964 | 448 | 140 | −7.40 | 9.81 | 2.93 | 122.7 | 54.2 | 29.4 | 16.4 | 2.3 | 0.9 |
| 16 | 911 | 479 | 200 | −7.40 | 7.38 | 1.47 | 123.6 | 55.0 | 28.4 | 16.7 | 1.4 | |
| 17 | 1643 | 446 | −40 | −10.00 | 6.00 | −0.40 | 124.7 | 53.3 | 32.3 | 14.4 | 0.3 | 1.3 |
| 18 | 1344 | 497 | 120 | −9.90 | 8.38 | 1.07 | 124.0 | 53.9 | 31.2 | 14.9 | 1.0 | 0.2 |
| 19 | 825 | 415 | 210 | −7.30 | 11.10 | 3.74 | 127.3 | 54.7 | 30.5 | 14.8 | −2.3 | |
| 20 | 1850 | 379 | −30 | −10.20 | 7.14 | 0.19 | 124.3 | 53.1 | 34.4 | 12.5 | 0.7 | 1.2 |
| 21 | 1017 | 503 | 100 | −9.84 | 7.86 | 0.78 | 128.5 | 54.2 | 33.3 | 12.5 | −3.5 | 0.1 |
| 22 | 960 | 458 | 20 | −6.27 | 10.80 | 3.95 | 118.0 | 54.3 | 27.4 | 18.4 | 7.1 | −0.3 |
| 23 | 1453 | 521 | 20 | −4.70 | 4.20 | 0.64 | 113.8 | 53.1 | 24.7 | 22.3 | 11.2 | 0.5 |
| 24 | 1826 | 425 | −20 | −6.60 | 2.90 | −0.90 | 114.1 | 52.2 | 26.0 | 21.8 | 10.9 | −0.3 |
| 25 | 1295 | 386 | −30 | −8.89 | 4.48 | −0.27 | 130.1 | 52.7 | 37.4 | 9.9 | −5.1 | 1.3 |
| 26 | 1140 | 380 | −40 | −14.10 | 10.70 | 0.78 | 138.8 | 53.5 | 38.3 | 8.2 | −13.8 | 1.0 |

First of all, as shown in Table 1, 26 kinds (Composition No. 1 to 26) of the magnetic heads having different composition ratios of single-crystal ferrite were prepared to determine the mean coefficients α ferrite of thermal expansion at temperatures ranging from 100° C. to 300° C., the magnetic strictions λ <100> of the crystallographic axis <100>, the magnetic strictions λ <111> of the crystallographic axis <111>, the magnetocrystalline anisotropic energy K1, the saturation magnetostriction λS and the effective magnetic permeabilities $\mu'$. The measured values thereof are described in Table 1.

Figure 4:
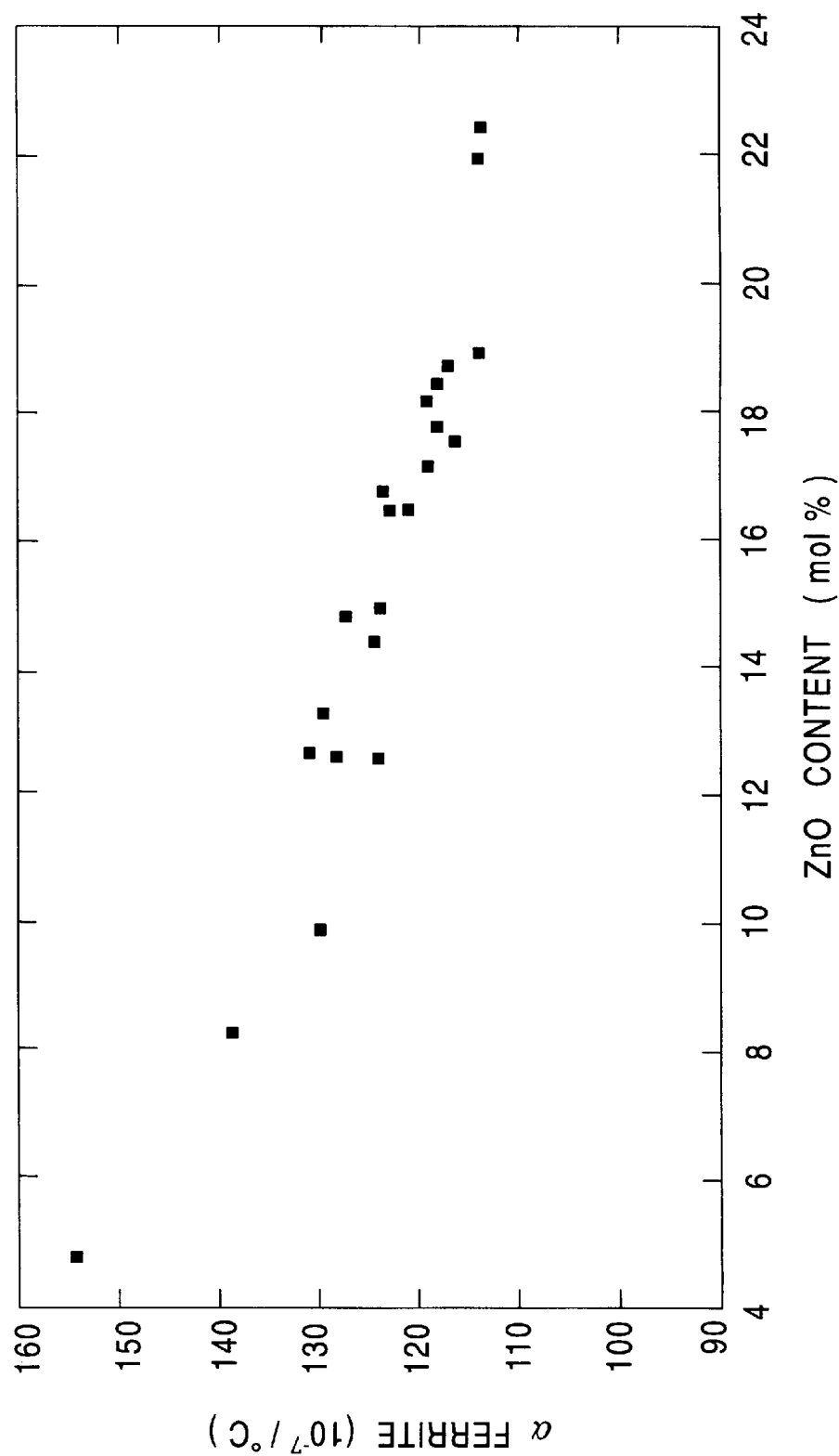
FIG. 4 is a graph showing the relation of mol % of the ZnO amount contained in ferrite to the mean coefficient α ferrite of thermal expansion of the single-crystal ferrite material at temperatures falling in a range of 100 to 300° C.

FIG. 4 is a graph showing the relation of mol % of the ZnO amount to the mean coefficient α ferrite of thermal expansion of ferrite material at temperatures falling in a range of 100 to 300° C.

As shown in the diagram, it can be found that the mean coefficient α ferrite of thermal expansion is reduced as the mol % of ZnO increases.

The mean coefficient α metal of thermal expansion of the soft magnetic material used in the present invention is on a level of 125 to 150 (10⁻⁷/° C.) at temperatures ranging from room temperatures to 600° C.

It can be found from the diagram that ZnO falling in a range of 8 mol % to 16 mol % causes the mean coefficient α ferrite of thermal expansion of ferrite to fall in a range of 120 to 140 (10⁻⁷/° C.) and can reduce a difference between the mean coefficient α metal of thermal expansion of the soft magnetic material and the mean coefficient α ferrite of thermal expansion of ferrite.

The magnetic heads formed of the ferrite materials containing ZnO falling in a range of 8 mol % to 16 mol % are 10 kinds of Samples No. 1, 11, 14, 17, 18, 19, 20, 21, 25 and 26 each shown in Table 1. Observing a difference (α metal−α ferrite) between the mean coefficient α metal of thermal expansion of the soft magnetic material and the mean coefficient α ferrite of thermal expansion of ferrite within the limit of these 10 kinds, the largest value of (α metal−α ferrite) is −13.8 in Sample No. 26, and the smallest value thereof is 0.3 in Samples No. 14 and 17. The smaller the absolute value of (α metal−α ferrite) is, the better. It falls preferably in a range of −10 (10⁻⁷/° C.)≦(α metal−α ferrite) ≦5 (10⁻⁷/° C.), and the ferrite material and the soft magnetic material have to be suitably selected so that they fall in this range.

Figure 5:
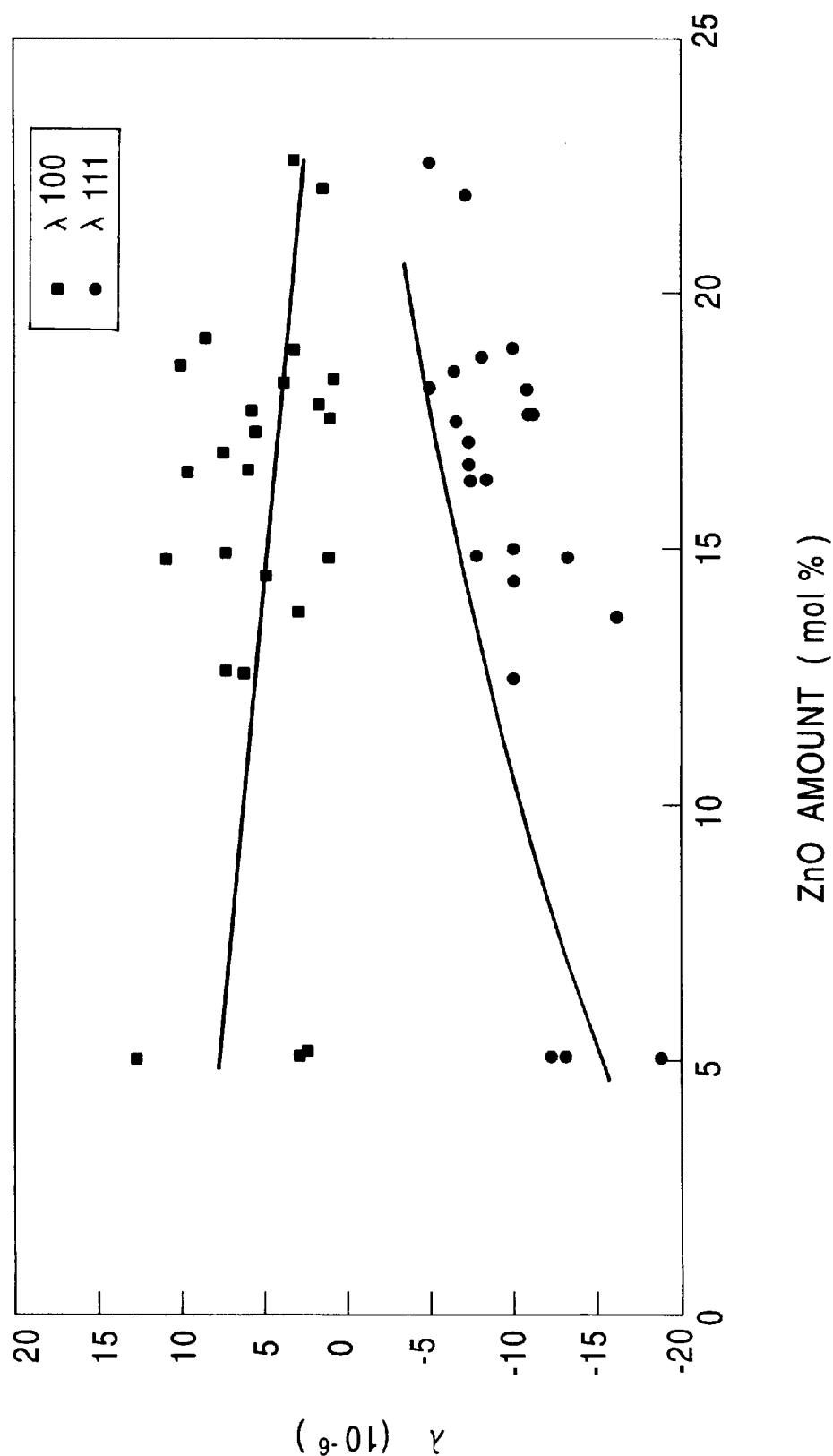
FIG. 5 is a graph showing the relation of mol % of the ZnO amount contained in ferrite to the magnetic striction λ <100> of a crystallographic axis <100> and the magnetic striction λ <111> of a crystallographic axis <111>.

FIG. 5 is a graph showing the relation of the mol % of the ZnO amount contained in ferrite to the magnetic striction λ <100> of the crystallographic axis <100> and the magnetic striction λ <111> of the crystallographic axis <111>.

As shown in the diagram, the magnetic striction λ <111> of the crystallographic axis <111> is always a positive value, and the magnetic striction λ <100> of the crystallographic axis <100> is always a negative value. Further, it can be found that the value of the magnetic striction λ <111> and the absolute value of the magnetic striction λ <100> grow larger as the mol % of the ZnO amount is lowered. That is, the ZnO amount falling in a range of 8 to 16 mol % elevates the magnetic strictions in a <100> direction and a <111> direction as compared with those conventional cases (in the conventional cases, the ZnO amounts are on the level of 16 to 19 mol %).

In general, it has so far been noted that because of the reason that an increase in the magnetic strictions in a <100> direction and a <111> direction causes the magnetic striction in the magnetic circuit direction (<100> direction) in the vicinity of the gap G to be readily influenced by stress, as small magnetic strictions in the <100> and <111> directions as possible are better, and such ferrite materials have so far been used. However, it has been confirmed, though shall be explained later with reference to the diagrams, that the head output of a magnetic head formed of ferrite containing ZnO falling in a range of 8 to 16 mol % becomes higher than the head output of a magnetic head formed of ferrite containing ZnO falling in a range of 16 to 19 mol % (conventional case). Accordingly, it has been found that a reduction in a difference between the mean coefficient α ferrite of thermal expansion of ferrite and the mean coefficient α metal of thermal expansion of the soft magnetic material is more effective for elevating the head output than a reduction in the magnetic striction in the magnetic circuit direction (<100> direction) in the vicinity of the gap G.

Figure 6:
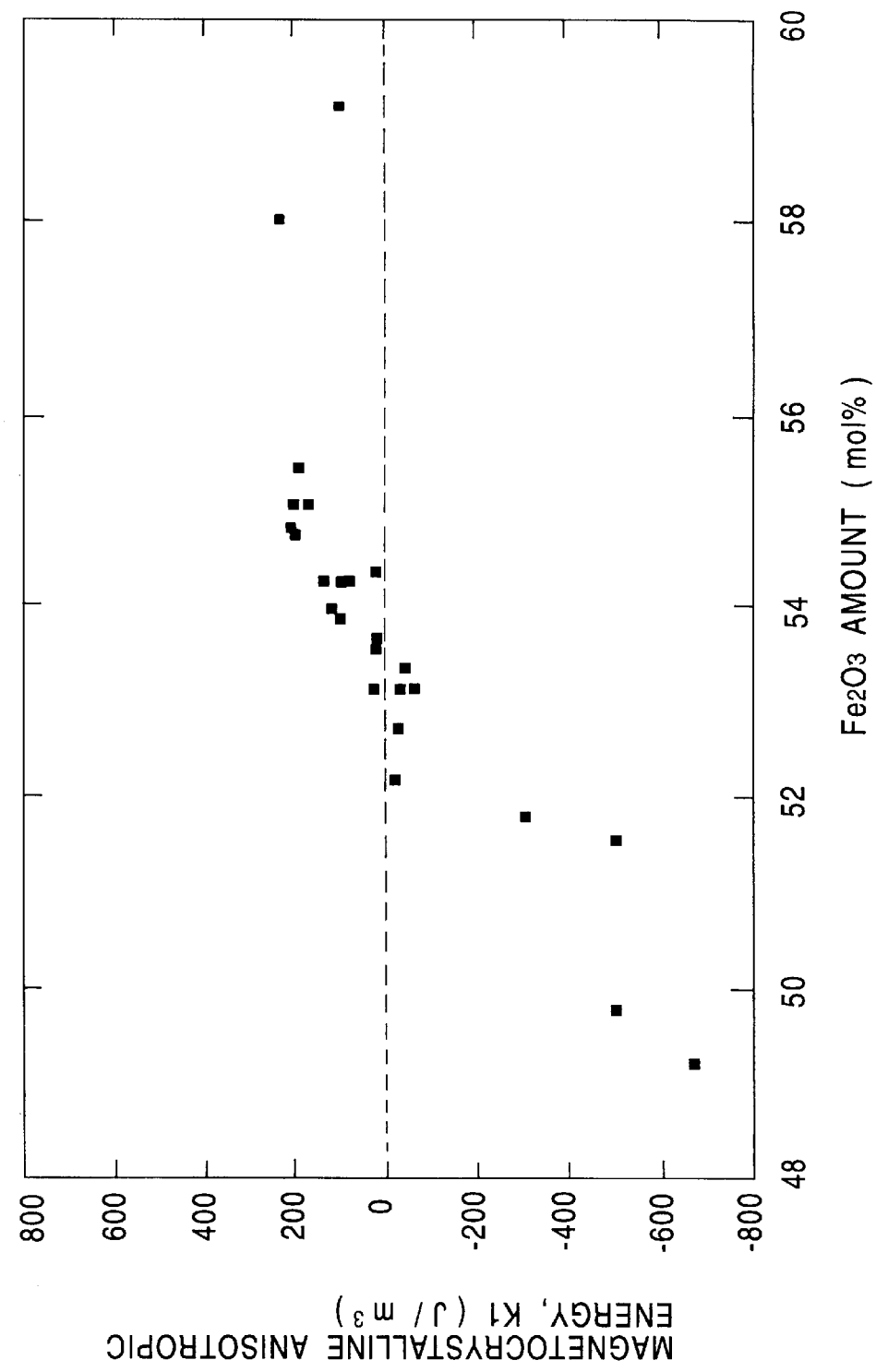
FIG. 6 is a graph showing the relation of mol % of the $Fe_2O_3$ amount contained in ferrite to the magnetocrystalline anisotropic energy K1.

FIG. 6 is a graph showing the relation of the mol % of the $Fe_2O_3$ amount to the magnetocrystalline anisotropic energy K1.

As shown in the diagram, it can be found that the $Fe_2O_3$ amount falling in a range of 52 to 54 mol % reduces the absolute value of the magnetocrystalline anisotropic energy K1.

Figure 7:
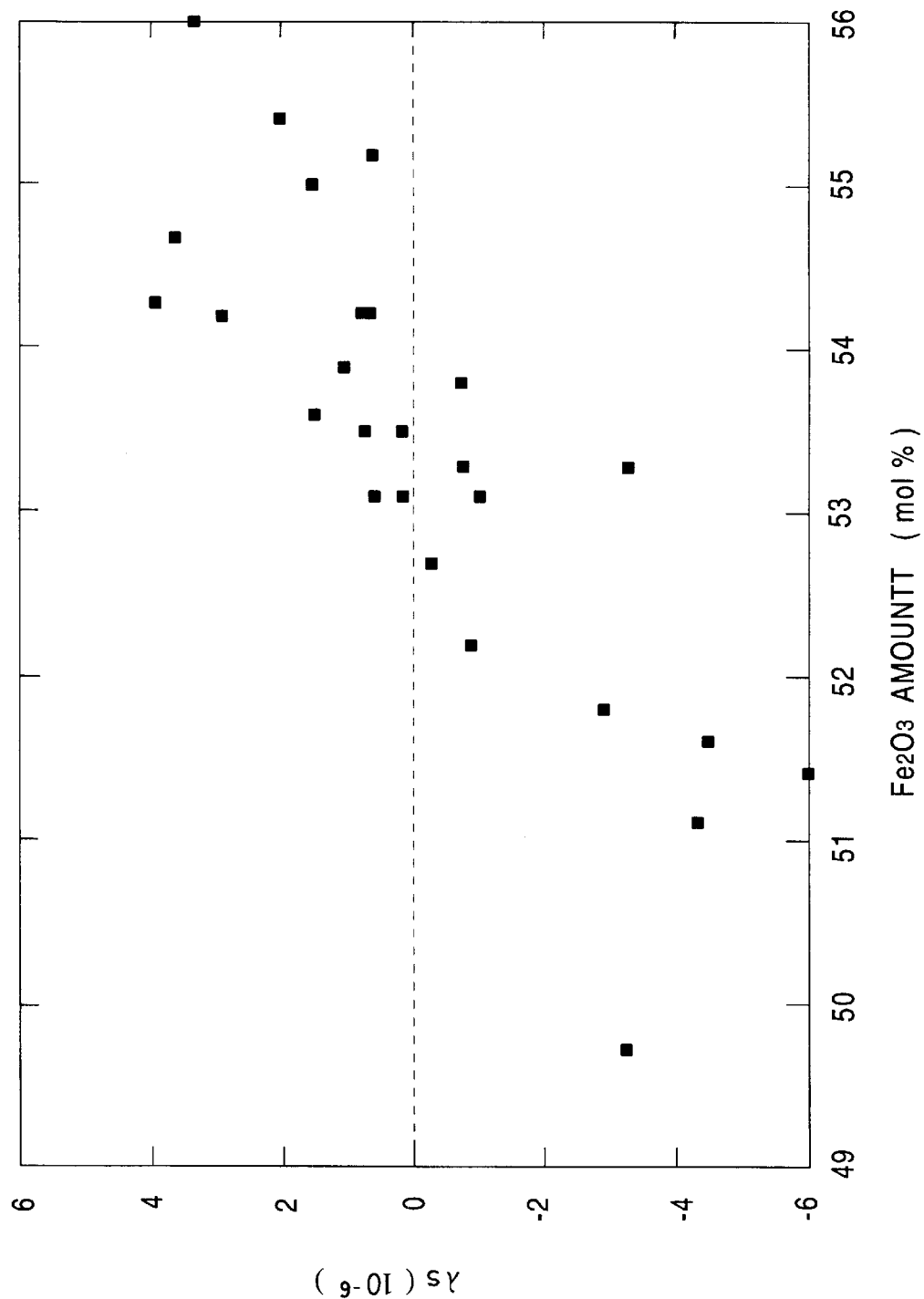
FIG. 7 is a graph showing the relation of mol % of the $Fe_2O_3$ amount contained in ferrite to the saturation magnetostriction λS.

FIG. 7 is a graph showing the relation of the mol % of the $Fe_2O_3$ amount to the saturation magnetostriction $\lambda S$. As shown in the diagram, it can be found that the absolute value of the saturation magnetostriction $\lambda S$ grows larger as the $Fe_2O_3$ amount deviates from a range of 52 to 54 mol % and in particular, if the $Fe_2O_3$ amount falls in a range of 52 to 54 mol %, the absolute value of the saturation magnetostriction $\lambda S$ described above is reduced.

Figure 8:
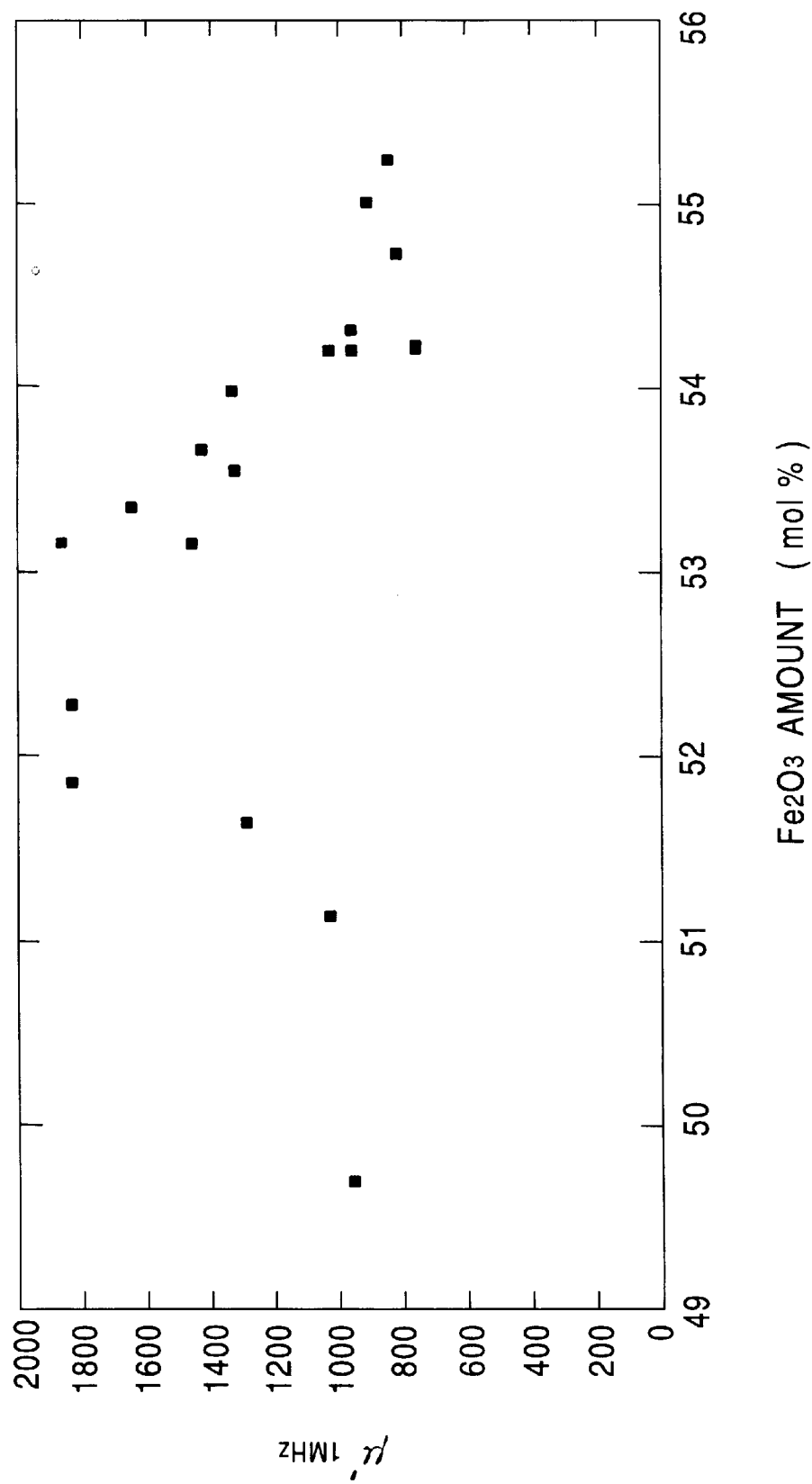
FIG. 8 is a graph showing the relation of mol % of the $Fe_2O_3$ amount contained in ferrite to the absolute value of the effective magnetic permeability $\mu'$ at 1 MHz.

Further, FIG. 8 is a graph showing the relation of the mol % of the $Fe_2O_3$ amount to the effective magnetic permeability $\mu'$. The value of $\mu'$ is a value determined in a high frequency area of 1 MHz.

As shown in the diagram, it can be found that the $Fe_2O_3$ amount falling in a range of 52 to 54 mol % maximizes the value of $\mu'$.

As can be seen from the above, the $Fe_2O_3$ amount falling in a range of 52 to 54 mol % can reduce the absolute value of the magnetocrystalline anisotropic energy K1 and the absolute value of the saturation magnetostriction $\lambda S$ and can elevate the effective magnetic permeability $\mu'$.

The magnetic anisotropy of the magnetic axis is considered to depend on the apparent magnetic anisotropic energy obtained by subtracting the magnetoelastic energy which is proportional to the product of the stress σ total and the saturation magnetostriction $\lambda S$ from the magnetocrystalline anisotropic energy K1. It is estimated that in order to elevate the head output in a high frequency area, the absolute value of the apparent magnetic anisotropic energy described above has to be reduced to turn the magnetic anisotropy into the isotropy.

Accordingly, in order to reduce the absolute value of the apparent magnetic anisotropic energy, the absolute value of the magnetocrystalline anisotropic energy K1 and the absolute value of the magnetoelastic energy have to be lowered.

That is, in the magnetic heads of Samples No. 17, 18, 20, 25 and 26 in which the $Fe_2O_3$ amount falls in a range of 52 to 54 mol % and the ZnO amount falls in a range of 8 to 16 mol %, both of the absolute value of the magnetocrystalline anisotropic energy K1 and the absolute value of the magnetoelastic energy are reduced, and as a result thereof, it is expected that the absolute value of the apparent magnetic anisotropic energy is reduced and the head output is enhanced.

Samples No. 17, 18, 20, 25 and 26 described above are included in the ternary diagram (b) shown in FIG. 3, and the absolute value of the magnetocrystalline anisotropic energy K1 and the absolute value of the saturation magnetostriction $\lambda S$ of the ferrite materials formed in this range are lowered. The ferrite material has a mean coefficient of thermal expansion falling in a range of 120 to 140 ($10^{-7}$/° C.), and the absolute value of (α metal–α ferrite) is reduced as well. The use of glass having almost the same mean coefficient α glass of thermal expansion as the mean coefficient α ferrite of thermal expansion of ferrite for the adhesive glass 3 reduces the absolute value of the stress σ total exerted in the magnetic circuit direction in the vicinity of the gap and lowers as well the magnetoelastic energy which is proportional to the product of the saturation magnetostriction $\lambda S$ and the stress σ total. Accordingly, it is presumed that the absolute value of the apparent magnetic anisotropic energy is reduced and the high output can be obtained in a high frequency area.

Figure 9:
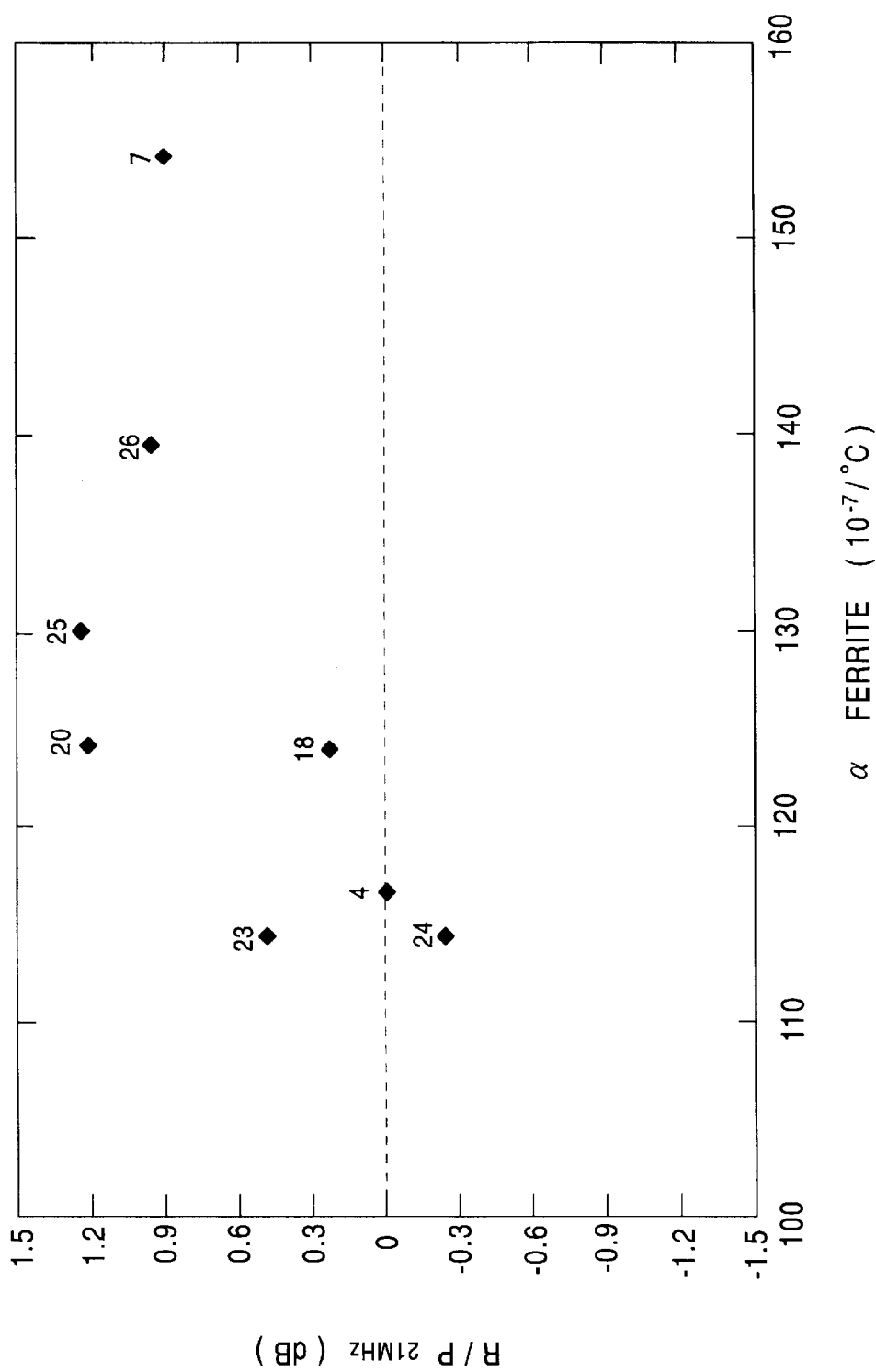
FIG. 9 is a graph showing the relation of the head output to the mean coefficients α ferrite of thermal expansion of the samples No. 4, 7, 18, 20, 23, 24, 25 and 26 each shown in Table 1, in which the $Fe_2O_3$ amounts contained in ferrite shown in Table 1 range from 52 to 54 mol %.

The $R/P_{21\ MHz}$ values (head output values in self recording/reproducing) of several magnetic heads in a high frequency area of 21 MHz are described in the extreme right column of Table 1. The head output values (dB) shown in Table 1 are shown by the values relative to the head output value of Sample No. 4, which is set to 0 dB. Shown in FIG. 9 is the relation of the mean coefficients α ferrite of thermal expansion of ferrites to the head outputs (dB) in 8 kinds of the magnetic heads of Samples No. 4, 7, 18, 20, 23, 24, 25 and 26 out of them, which are formed of ferrites having the $Fe_2O_3$ amounts falling in a range of 52 to 54 mol %. Incidentally, Sample No. 4 described above is the magnetic head formed in a composition ratio falling in a range of the ternary diagram (a) shown in FIG. 3, that is, a conventional composition ratio.

As shown in the diagram, it can be found that if the mean coefficient α ferrite of thermal expansion of ferrite falls in a range of 120 to 140 ($10^{-7}$/° C.), the head output (dB) grows higher. In particular, the head outputs (dB) of Samples No. 20, 25 and 26 are 0.9 (dB) or more, which stays on a very high level.

If the mean coefficient α ferrite of thermal expansion of ferrite falls in a range of 120 to 140 ($10^{-7}$/° C.), a difference between the mean coefficient α ferrite of thermal expansion of ferrite and the mean coefficient α metal of thermal expansion of the soft magnetic material is reduced. That is, the absolute value of the stress α total exerted in the magnetic circuit direction in the vicinity of the gap is reduced, and therefore the absolute value of the magnetoelastic energy is lowered. As a result thereof, the absolute value of the apparent magnetic anisotropic energy is reduced as well to weaken the magnetic anisotropy. It is presumed that spin-rotation becomes liable to be exerted in a high frequency area of 21 MHz by making the magnetic anisotropy isotropically close and the head output is elevated.

The values of the stress σ total, the magnetoelastic energy and the apparent magnetic anisotropic energy of Samples No. 4, 23, 25 and 26 are described in Table 2. As can be found from the ternary diagram shown in FIG. 3, all of 5 kinds of these magnetic heads are formed of the ferrites having the $Fe_2O_3$ amounts falling in the vicinity of 53 mol %.

TABLE 2

| Ferrite $\alpha_{F100-300}$ ($10^{-7}$/° C.) | $\lambda s$ ($10^{-6}$) | $\lambda_{100}$ ($10^{-6}$) | $\lambda_{111}$ ($10^{-6}$) | K1 (J/m$^3$) | Glass $\alpha_{g100-300}$ ($10^{-7}$/° C.) | $\sigma_M$ (MPa) | $\sigma_g$ (MPa) | $\sigma_{total}$ (MPa) | Magnetoelastic energy $3/2 \cdot \lambda \cdot \sigma$ total (J/m$^3$) | Apparent anisotropic energy K1-$3/2 \cdot \lambda \cdot \sigma$ total (J/m$^3$) | R/P$_{21\ MHz}$ (dB) |
|---|---|---|---|---|---|---|---|---|---|---|---|
| 4 116 | −1 | −6.4 | 6 | −60 | 106 | −900 | 12 | −888 | 1323 | −1383 | 0 |
| 23 113.8 | 0.6 | −4.7 | 4.2 | 20 | 118 | −950 | −18 | −968 | −871 | 891 | 0.5 |
| 20 124.29 | 0.2 | −10.2 | 7.1 | −30 | 118 | −800 | −4 | −804 | −241 | 211 | 1.2 |
| 25 130.07 | −0.27 | −8.89 | 5.48 | −30 | 130 | −720 | 6 | −714 | 289 | −319 | 1.3 |
| 26 138.78 | −0.77 | −14.1 | 10.7 | −30 | 130 | −620 | 50 | −570 | 658 | −688 | 0.95 |

Glasses having almost the same mean coefficient α glass of thermal expansion as the mean coefficient α ferrite of thermal expansion of ferrite at temperatures falling in a range of 100 to 300° C. are used for the adhesive glass, and the mean coefficients α glass of thermal expansion of the adhesive glasses used for the respective magnetic heads are shown in Table 2.

The stresses σ M shown in Table 2 correspond to the stresses exerted from the soft magnetic materials to the magnetic circuit direction (<100> direction) of the cores in the vicinity of the gap. Further, the stresses σ g correspond to the stresses exerted from the adhesive glasses to the magnetic circuit direction of the cores in the vicinity of the gap. The stress σ total is obtained by adding σ M to σ g described above.

The term 3/2·λS·σ total means a value of the magnetoelastic energy, and the term K1–3/2·λS·σ total means a value of the apparent magnetic anisotropic energy.

Figure 10:
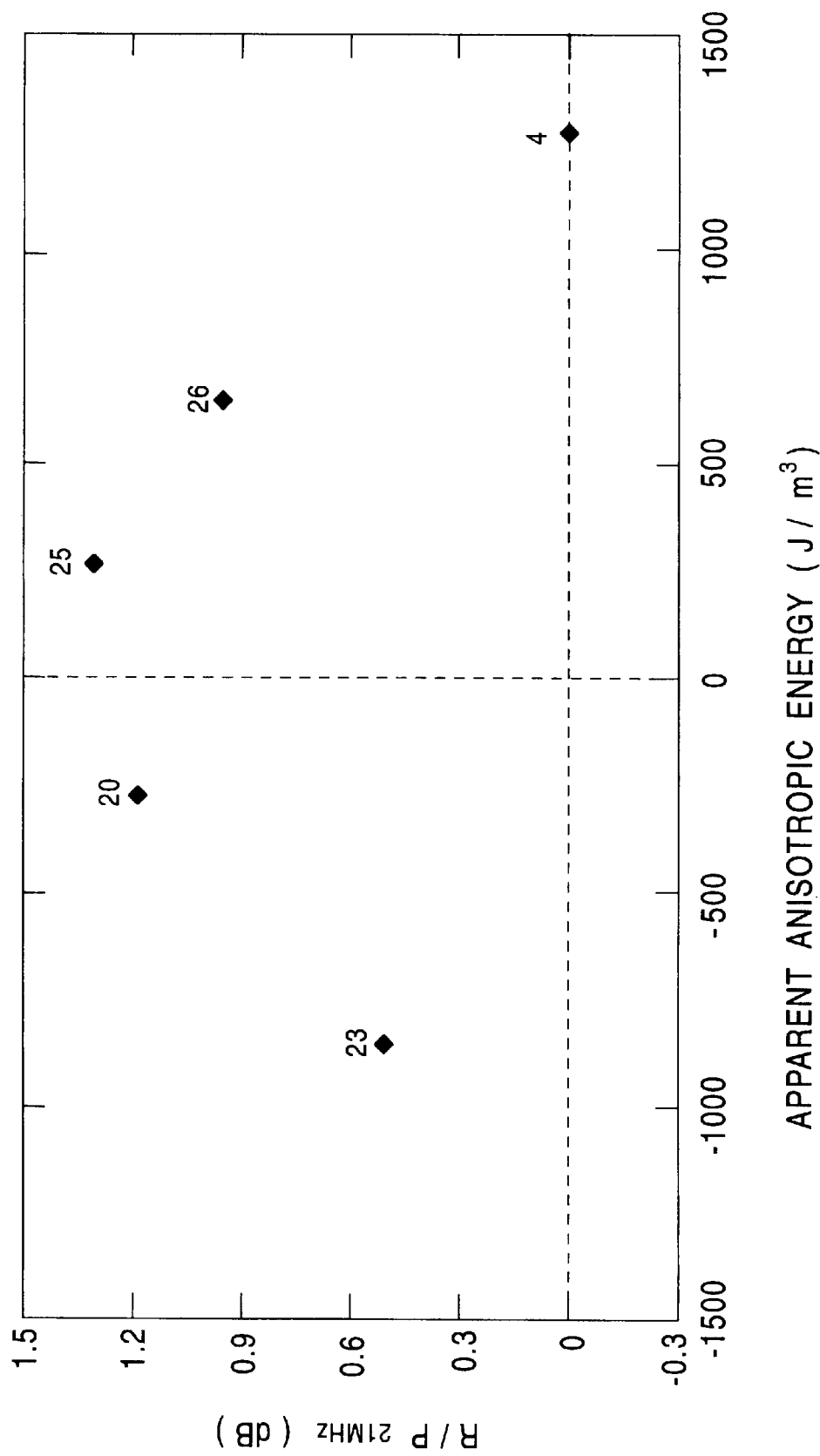
FIG. 10 is a graph showing the relation of the head outputs to the apparent magnetic anisotropic energies of the samples No. 4, 20, 23, 25 and 26 each shown in Table 2.
Figure 11:
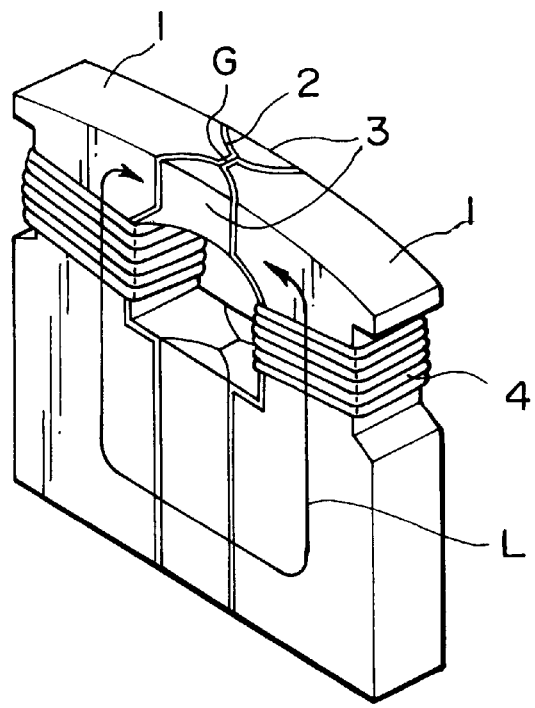
FIG. 11 is a perspective drawing of a conventional magnetic head.
Figure 12:
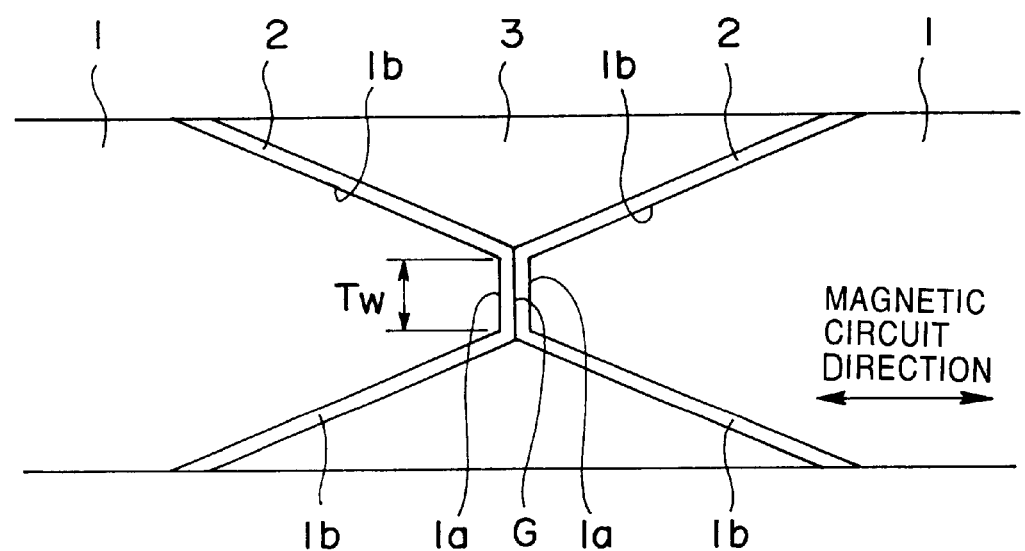
FIG. 12 is an enlarged plan view showing a part in the vicinity of the gap of the conventional magnetic head.

FIG. 10 is a graph showing the relation of the head output (dB) to the apparent magnetic anisotropic energy.

As shown in the diagram, it can be found that the smaller the apparent magnetic anisotropic energy is, the larger the head output (dB) is. In particular, it can be found that the magnetic heads of Samples No. 20, 25 and 26 using the ferrites formed in the composition ratios falling in a range of (b) shown in the ternary diagram of FIG. 3 have the pretty high magnetic head outputs (dB) as compared with the head output (dB) of Sample No. 4 or 23 using ferrite having a conventional composition.

This is because in all of five kinds of the magnetic heads, the absolute values of K1 and λS depending on the mol % of Fe$_2$O$_3$ are suppressed low, but as can be seen from Table 1 and FIG. 1, the mol % of the ZnO amounts of the magnetic heads of Samples No. 4 and 23 is elevated as compared with the mol % of the ZnO amounts of the magnetic heads of Samples No. 20, 25 and 26. Accordingly, the mean coefficients α ferrite of thermal expansion of the ferrite materials used for Samples No. 4 and 23 are reduced as compared with the mean coefficients α ferrite of thermal expansion of the ferrite materials used for Samples No. 20, 25 and 26, and the value of (α metal−α ferrite) deviates from the range of −10≦(α metal−α ferrite)≦5 to a large extent. Consequently, as shown in Table 2, the absolute value of the stress σ total exerted to the magnetic circuit direction in the vicinity of the gap G grows considerably large in the magnetic heads of Samples No. 4 and 23, and the absolute value of the magnetoelastic energy and the absolute value of the apparent magnetic anisotropic energy are inevitably increased as well.

Thus, the absolute value of the apparent magnetic anisotropic energy can be reduced by using the ferrite materials formed in the composition ratio falling in the range of (b) shown in the ternary diagram of FIG. 3 even if the soft magnetic materials which are excellent in magnetic characteristics and have a higher mean coefficient of thermal expansion than the mean coefficient of thermal expansion of the soft magnetic materials such as sendust are used for the metal magnetic film. As a result thereof, the magnetic anisotropy of the crystallographic axis is brought close to the isotropy, and therefore the head output can be elevated in a high frequency region.

According to the present invention described above in detail, the stress exerted to the gap-opposing part can be lowered by setting the ZnO amount contained in the ferrite to 8 to 16 mol % to increase the mean coefficient of thermal expansion of the ferrite as compared with those of conventional ones even when used are the soft magnetic materials having a high mean coefficient of thermal expansion while having excellent magnetic characteristics as compared with those of sendust.

Further, the absolute value of the magnetocrystalline anisotropic energy K1 and the absolute value of the saturation magnetostriction λS can be reduced by setting the Fe$_2$O$_3$ amount contained in the ferrite to 52 to 54 mol %.

Accordingly, since both of the absolute value of the magnetocrystalline anisotropic energy K1 and the absolute value of the magnetoelastic energy can be reduced, the absolute value of the apparent magnetic anisotropic energy is lowered as well. Thus, the anisotropy of the crystallographic axis is brought close to isotropy, and spin-rotation is liable to be exerted, whereby the magnetic permeability and the head output can be elevated.

What is claimed is:

1. A magnetic head in which a metal magnetic film made of a soft magnetic material is formed on a gap-opposing part of a pair of cores, the gap-opposing part including magnetic tape rubbing planes of said pair or cores, the gap-opposing part being formed of single-crystal ferrite, and an adhesive material for connecting the cores at said gap-opposing part is filled on the side parts of said cores, said single-crystal ferrite being composed of Fe$_2$O$_3$, MnO and ZnO, the composition ratio of Fe$_2$O$_3$:ZnO being 52 to 54 mol %: 8 to 16 mol % and the balance thereof being MnO, wherein said single-crystal ferrite has a mean coefficient α ferrite of thermal expansion ranging from 120 to 140 ($10^{-7}$/° C.) at temperatures falling in a range of 100 to 300° C., said metal magnetic film comprises a composition represented by a formula Fe$_{100-a-b-c-d}$—X$_a$—M$_b$—Z$_c$—T$_d$, X representing either or both of Si and Al, M representing at least one metal selected from the group consisting of Zr, Hf, Nb and Ta, Z representing either or both of C and N, T representing at least one metal selected from the group consisting of Cr, Ti, Re, Ru, Rh, Ni, Co, Pd, Pt and Au, $0.5 \leq a \leq 25$ (atomic %), $1 \leq b \leq 10$ (atomic %), $0.5 \leq c \leq 15$ (atomic %), $0 \leq d \leq 10$ (atomic %), the balance thereof being atomic % of Fe, and the metal magnetic film is formed of the soft magnetic material containing crystal of carbide or nitride of the metal group M.

2. The magnetic head as described in claim 1, wherein a difference between the mean coefficient α metal of thermal expansion of the soft magnetic material and the mean coefficient α ferrite of thermal expansion of the ferrite is $-10$ $(10^{-7}/°C.) \leq (\alpha \text{ metal}-\alpha \text{ ferrite}) \leq 5 (10^{-7}/°C.)$ at temperatures falling in a range of 100 to 300° C.

3. The magnetic head as described in claim 1, wherein a stress α total exerted to the gap-opposing part in a magnetic circuit direction is 800 (MPa) or less in terms of an absolute value.

4. The magnetic head as described in claim 2, wherein the stress α total exerted to the gap-opposing part in the magnetic circuit direction is 800 (MPa) or less in terms of an absolute value.

5. A magnetic head in which a metal magnetic film made of a soft magnetic material is formed on a gap-opposing part of a pair of cores, the gap-opposing part including magnetic tape rubbing planes of said pair or cores, the gap-opposing part being formed of single-crystal ferrite, and an adhesive material for connecting the cores at said gap-opposing part is filled on the side parts of said cores, said single-crystal ferrite being composed of $Fe_2O_3$, MnO and ZnO, the composition ratio of $Fe_2O_3$:ZnO being 52 to 54 mol %: 8 to 16 mol % and the balance thereof being MnO, wherein said single-crystal ferrite has a mean coefficient α ferrite of thermal expansion ranging from 120 to 140 $(10^{-7}/°$ C.) at temperatures falling in a range of 100 to 300° C., said metal magnetic film comprises a composition represented by a formula $Fe_{100-e-f-b-c-d}$—$Si_e$—$Al_f$—$M_b$—$Z_c$—$T_d$, M representing at least one metal selected from the group consisting of Zr, Hf, Nb and Ta, Z representing either or both of C and N, T representing at least one metal selected from the group consisting of Cr, Ti, Re, Ru, Rh, Ni, Co, Pd, Pt and Au, $8 \leq e \leq 15$ (atomic %), $0.5 \leq f \leq 10$ (atomic %), $1 \leq b \leq 10$ (atomic %), $0.5 \leq c \leq 15$ (atomic %), $0 \leq d \leq 10$ (atomic %), the balance thereof being atomic % of Fe, and the metal magnetic film is formed of the soft magnetic material containing crystal of carbide or nitride of the metal group M.

6. The magnetic head as described in claim 5, wherein a difference between the mean coefficient α metal of thermal expansion of the soft magnetic material and the mean coefficient α ferrite of thermal expansion of the ferrite is $-10$ $(10^{-7}/°C.) \leq (\alpha \text{ metal}-\alpha \text{ ferrite}) \leq 5 (10^{-7}/°C.)$ at temperatures falling in a range of 100 to 300° C.

7. The magnetic head as described in claim 5, wherein a stress α total exerted to the gap-opposing part in a magnetic circuit direction is 800 (MPa) or less in terms of an absolute value.

8. The magnetic head as described in claim 6, wherein the stress α total exerted to the gap-opposing part in the magnetic circuit direction is 800 (MPa) or less in terms of an absolute value.

* * * * *

UNITED STATES PATENT AND TRADEMARK OFFICE
CERTIFICATE OF CORRECTION

PATENT NO. : 5,948,554
DATED : September 7, 1999
INVENTOR(S) : Hiroshi Yamagami et al.

It is certified that error appears in the above-identified patent and that said Letters Patent is hereby corrected as shown below:

On the Title Page

In column 2, line 8, change "Hasegawe" to --Hasegawa et al.--.

In claim 1, line 4, change "or" to --of--.

In claim 5, line 4, change "or" to --of--.

Signed and Sealed this

Fifth Day of September, 2000

Attest:

Q. TODD DICKINSON

Attesting Officer

Director of Patents and Trademarks